Feb. 3, 1953 W. J. SECREST 2,627,296
APPARATUS FOR TENSION-CALENDERING FABRIC
Filed June 8, 1949 2 SHEETS—SHEET 1
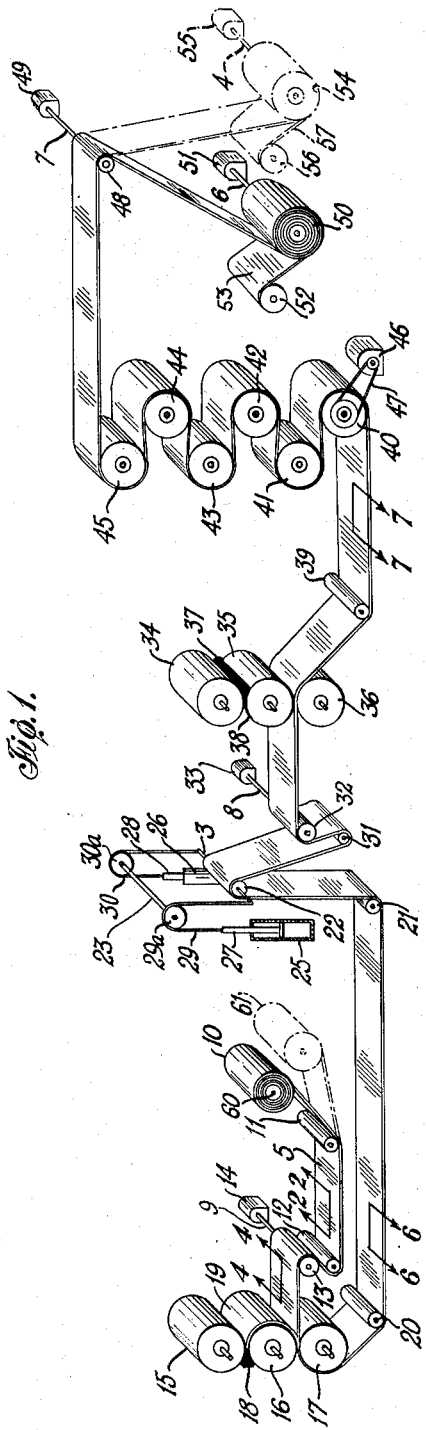
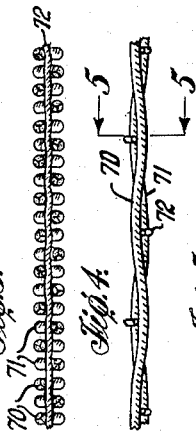
INVENTOR.
William J. Secrest
BY
ATTORNEYS Patented Feb. 3, 1953

2,627,296

UNITED STATES PATENT OFFICE 2,627,296

APPARATUS FOR TENSION-CALENDERING FABRIC

William J. Secrest, Cuyahoga Falls, Ohio, assignor to The Firestone Tire & Rubber Company, Akron, Ohio, a corporation of Ohio Application June 8, 1949, Serial No. 97,766

2 Claims. (Cl. 154—1.75)

This invention relates to the incorporation of cord tire fabric, or a plurality of separate closely spaced cords, commonly known as weftless cord fabric, in a rubber sheet although in certain respects it has use in connection with rubberizing other forms of fabric or material.

Pneumatic rubber tires commonly include a number of superimposed relatively thin plies of rubberized strain members composed of cotton, rayon, nylon or other material found satisfactory. The strain members are ordinarily rubberized by one or more passes between the rolls of a rubber calender or calenders whereby softened rubber compound is formed into a sheet about the said members. Before calendering, but preparatory thereto, the strain members are usually in a roll supported in a stock rack near a calender. It is to be understood, however, that instead of being in rolls the strain members may be in the form of separate cords led to a calender from stock rolls mounted in a creel. After calendering the rubberized strain members in sheet form are usually wound together with separating liners into a roll on suitable take-off stock shells mounted on a driven shaft.

It is important and difficult to obtain the desired accurate proportions and arrangement of cord and rubber in sheet form. It is important because laminated articles such as pneumatic cord tires need to be built for protection to the cords and for resiliency in use. The proportion of cord to rubber and the arrangement of cords relative to the rubber are, therefore, factors which must be considered in building such tires and other laminated articles of the two materials. The nature of the original steps, in bringing the rubber and cords together, is important since, for example, in manufacturing pneumatic cord tires, the optimum beneficial results can be obtained from the strain members only when the cords are parallel, equally spaced, have the same amount of residual stretch and are so insulated from each other with rubber that the cords, or strain members, will not be drawn into contact with each other either in the tire building operation, during tire molding, or when the tire is used in service. Additionally, it is important in obtaining the best results from cord strain members composed of textile fibers that the rubber surround each cord, grip, or very snugly encase the cord whereby the cord is not subjected to excessive internal friction when the tire is flexed by contact with the road in service. It is to be noted that unless the rubber and cords are properly associated in their original incorporation, one with the other, subsequent operations on the two materials as a unit will fail to correct the error.

Heretofore in rubberizing cord tire fabric by calendering, the cords have been subjected to longitudinal tension by the provision of a mechanical, hand-regulated friction brake on the shaft on which the stock shell of a roll of bare cord fabric was mounted. As the fabric was progressively passed through a calender by the rotation of the cooperation calender rolls, the fabric was subjected to tension resulting from the braking action on said shaft. This method of applying tension to the cords was not entirely satisfactory, principally due to the variation of tension applied to different cords at a given time and variation of the total tension applied. As the cord fabric unwound and the diameter of the fabric roll decreased, the pull on the fabric increased in order to overcome the brake resistance since there were no means for compensating for the progressive reduction of the diameter of the fabric roll.

Variation of tension on the cords in the rubberizing operation, as heretofore performed, also resulted due to the fact that at least one of the calender rolls between which the fabric passed had its fabric contact surface covered with heat-softened rubber. This rubber passed between the calender roll and fabric and accordingly the drive of that particular roll against the fabric was not positive and slippage between calender rolls and fabric sometimes occurred. Such slippage will occur when the tension on the fabric becomes greater than the hold of the rolls and soft rubber on the fabric. The softer the rubber on the calender roll at a given opening between the calender rolls, the less the grip, however, as is well known by those familiar with rubberizing fabric on calenders, the softness of the rubber varies throughout the mass of rubber. Consequently the rubber passing between the calender rolls does not afford a uniform grip on all the cords across the length of the bite of the rolls. For this reason some cords may be slowed down in their advance resulting in uneven residual stretch in the individual cords.

In tire service the strain members of the tire plies are subjected to the tire inflation pressure. Since this is a continuing strain throughout the life of the tire the strain members tend to gradually stretch to their elastic limit. This results in what is known as tire growth. Too much tire growth will cause tire ply and other separation and develop premature tire failure. This is particularly true when the amount of residual stretch left in cord tire strain members is not uniform. On the other hand, tire strain members without any residual stretch left therein tend to become ruptured upon sudden strains to which they are subjected when a tire in service runs over stones, curbs or other obstructions. For these and other reasons it is of great assistance to a tire engineer to be able to accurately regulate the residual stretch left in each individual cord of a tire.

The variations in the tension to which the cords are subjected in their rubberizing operation results in the cords at their low tension period being flattened into an elliptical cross-section shape as the cords are squeezed between calender rolls the moment rubber is being forced on and between the cords. The flattening of the cords reduces the available space between the cords into which rubber may flow. After the squeeze pressure on the cords is released the cords return, at least partially, to their original round shape which leaves the space between the cords not completely filled with rubber. Since before the present invention only relatively low tensions were possible, the fault of flattening the cords was always present. Actually, heretofore a calender operator has had to be ever on the alert to use the maximum pressure without extreme flattening of the cords and/or causing the cords to back up into a wrinkle and become crushed. The higher tension on the cords made available to the calender operator by the present invention solves this problem or at least makes possible greatly improved calendering since at the time the rubber is pressed about the cords they have their maximum spacing and are taut and firm, thus resisting backing up, flattening and providing somewhat shallower and wider spaces between the cords into which the rubber more readily flows and completely fills.

The mechanical brakes referred to above are manually adjusted, require a great amount of maintenance and in operation are necessarily adjusted according to the calender operator's idea, it being impossible to follow a working specification as to tensions relative to any particular calendering operation.

In calendering a series of parallel cords into weftless cord tire fabric which fabric is held together in sheet form by means of rubber only, the individual cords are placed under tension by being led about small rollers, usually of an idler type, dragged over bars, and through guides, etc., in their travel from their cones mounted in a creel to the calender. It is possible and practical to deliver the cords from the creel to the calender by these arrangements with but slight tension on each cord. Calendering such cords presents problems which applicant's invention substantially overcomes as will be explained as the specification proceeds.

An object of the invention is to provide means for placing cord tire strain members, rubberized by calendering, under predetermined equal tensions just before and after their passage through a calender.

Another object is to subject the individual cords of tire fabric, whether weftless or not, to more equal tension than has been possible heretofore during a rubberizing operation.

A further object is to pass cord tire fabric strain members through a calender during a rubberizing operation under tension sufficient to prevent the distortion of the rubber, caused by the squeeze of the calender rolls, from causing the strain members to wrinkle just prior to passing between the calender rolls and because of such wrinkles becoming crushed or injured.

A further object is to subject cord tire fabric being rubberized by calendering to longitudinal tension independent of the stock roll of fabric from which the fabric is being unwound.

A still further object is to subject cord fabric being rubberized on a calender to a constant high tension as it traverses the space between the front of the calender and a tension means whereby fabric width-control devices and spreaders commonly used in calendering cord fabric will operate uniformly on the cords thus maintaining the cords parallel and uniformly spaced.

Another object is to subject the cords of cord tire fabric or of above referred to weftless cords to higher and constant longitudinal tension, during calendering, than has been practical heretofore, the uniformly spaced parallel cords being taut and of temporarily reduced diameter when the calender rolls force rubber between and about said cords, whereby a snug contact of the rubber with the cords and a complete filling of the space between the cords is assured as the cords increase in diameter when relieved of the high tension.

Another object is to provide rubber calender tension means including regenerative braking whereby a substantial amount of the energy expended in creating the tension is returned to the line.

Another object is to provide means for applying a predetermined uniform tension on tire strain members on the feed side of a rubber calender independent of the fabric roll.

Another object is to provide tension means for rubber calenders adapted for much higher speeds than such devices heretofore known.

Another object of the present invention is to provide a method and apparatus by which each separate cord of a roll of cord fabric, or of a series of cords from cones in a creel, may be subjected to substantially the same predetermined longitudinal tension at the time they enter their first calender pass in a rubberizing operation.

Another object is to provide means adapted to subject each cord of a plurality of cords to substantially the same predetermined longitudinal tension whereby the cord strain members of an automobile tire will be more equally stressed in service.

Still another object is to provide tension means for subjecting cord tire strain members to substantially more longitudinal tension during rubberizing on a calender than has been possible heretofore without over-taxing the tension means.

Yet another object of the present invention is to provide means through which all of the strain members of the plies of a tire may have accurately controlled residual stretch left therein.

Further advantages and adaptations of the inventive concept will be apparent to those skilled in the art and reference will now be made to the accompanying drawings, wherein:

Fig. 1 is a fragmentary diagrammatic view of apparatus and material employed in steps in calendering cord fabric in accordance with the present invention;

Fig. 2 is a view taken on line 2—2 of Fig. 1 illustrating the crimp in the cord strain members as cord fabric is unwound from a roll of fabric and before it has been subjected to substantial tension;

Fig. 3 is a view on line 3—3 of Fig. 2 showing the position of the filling of pick threads relative to the warp when the warp is free of tension;

Fig. 4 is a view taken on line 4—4 of Fig. 1 illustrating the manner in which the crimp in the warp shown in Fig. 2 straightens out under longitudinal tension;

Fig. 5 is a view on line 5—5 of Fig. 4 illustrating the crimp which occurs in the filling thread shown in Fig. 3 when the warp is placed under tension;

Fig. 6 is a view taken on line 6—6 of Fig. 1 showing the relative position of rubber and warp after the first calender pass;

Fig. 7 is a view on line 7—7 of Fig. 1 showing the relative position of rubber and cords after the second and final calender pass.

Figure 8:
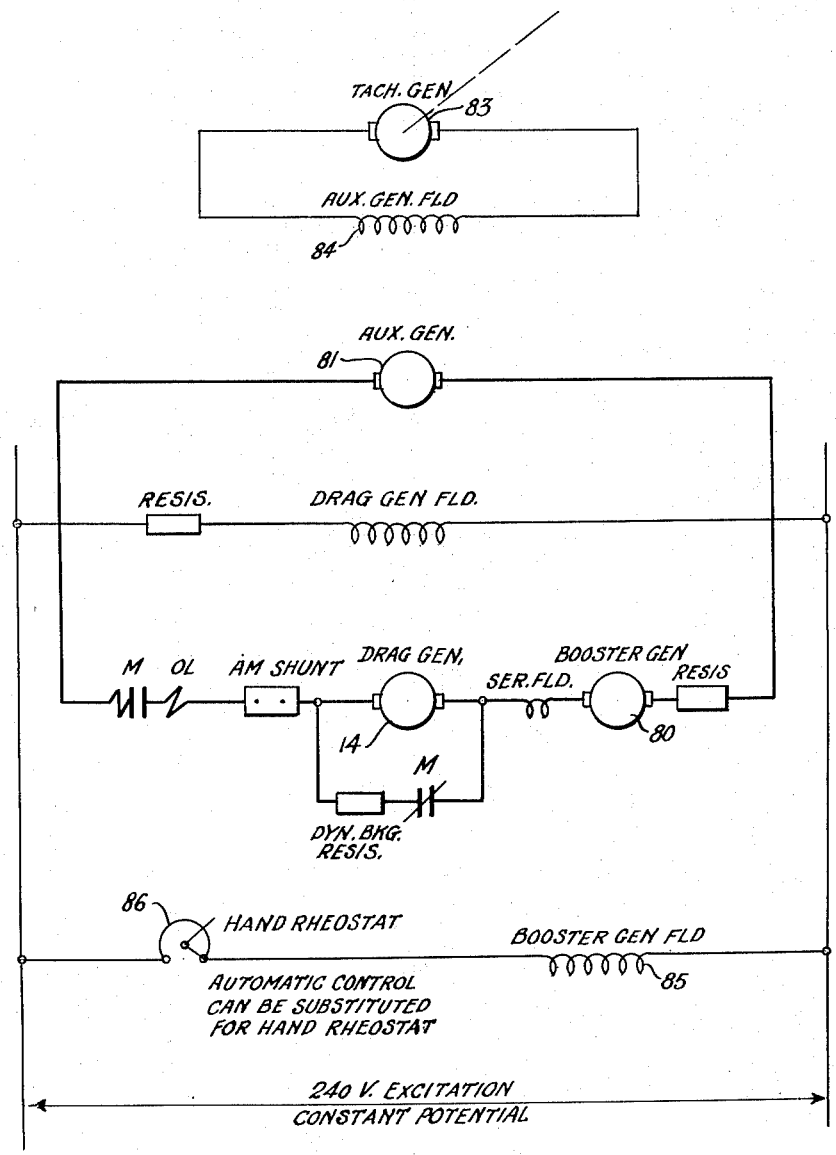
Fig. 8 is a wiring diagram showing the means by which various operations performed by the apparatus is controlled.

Referring to Fig. 1 in detail it will be seen that there is shown diagrammatically the principal elements employed in a continuous calendering operation of cord tire fabric. These elements in the order of their occurrence are a roll 10 of bare cord 5, idler rollers 11 and 12 and a rubber covered tension roll 13 the latter being connected to a drag generator 14 by means of a shaft 9, top, middle and bottom rolls 15, 16 and 17 respectively, of a three-roll rubber calender; a bank of rubber 18 between rolls 15 and 16, a calendered sheet of rubber 19 on the surface of roll 16, idler rolls 20 and 21, dancer roll 22, sprocket wheels 29a and 30a, air cylinders 25 and 26, piston rods 27 and 28, sprocket chains 29 and 30, idler roller 31, a tension roll 32 connected to a drag generator 33 by means of shaft 8; the top, bottom and middle rolls 34, 35 and 36 respectively, of a second rubber calender, a bank of rubber 37 between the rolls 34 and 35 of said second calender, a coat of rubber 38 on roll 35, idler roll 39, a series of drier or cooling rolls or drums 40, 41, 42, 43, 44 and 45, drum 40 being driven by a motor 46 through the medium of chain 47, a roll 48 driven by a motor 49 through the medium of a shaft 7; a stock take-off roll 50 driven by a motor 51 through the medium of a shaft 6, a roll 52 of liner from which a liner 53 is unwound and with the rubberized fabric is wound into a roll 50. Alternate take-off means are usually provided and such means are shown in broken lines wherein 54 is the stock take-off roll. Roll 54 is driven by motor 55 through the medium of a shaft 4. A liner roll 56, from which a liner 57 is drawn and with the rubberized fabric is wound into roll 54. It is to be understood that the elements enumerated above are retained in the usual supports which for the purpose of clarity in describing the invention are not shown.

The invention will now be explained in reference to rubberizing cord tire fabric in a continuous operation wherein two three-roll rubber calenders are arranged in tandem. It is to be understood, however, that the invention is not to be limited to rubberizing on any particular type or arrangement of calenders or calender rolls, since the method is useful in all cases where tire strain members are rubberized by being passed between revolving rolls whereby rubber is forced upon and about such strain members.

Referring again to Fig. 1, but in more detail, the roll 10 of fabric to be rubberized is received on a shell 60. This shell has square holes through its ends for mounting on a square bar. Heretofore a hand-regulated mechanical friction brake was connected to this bar which made possible resistance to the rotation of roll 10. In the present illustration no braking mechanism for roll 10 is shown, but it is to be understood that sufficient braking may be employed to prevent overrunning.

The leading end of the fabric of roll 10 is manually led under idler roll 12, over tension roll 13 and between rolls 16 and 17 of the first calender, thence under, over, or between the other above-mentioned elements in the order of their mentioned occurrence except the fabric is led between calender rolls 35 and 36 and does not contact calender roll 34, all as illustrated in Fig. 1. In actual practice, at the beginning of the operation the leading end of the fabric is attached to a liner as by cementing and the liner as a leader is led through the apparatus whereby rubberizing of the bare fabric can be started at the beginning of the lead end of the fabric, all as will be understood by those familiar with the art. After one roll of fabric has been rubberized the leading end of the following roll is attached to the last end of the proceeding roll whereby the succeeding rolls are started through the apparatus. Since the operation is a continuous one, provision for a succeeding roll of fabric as 61, shown in broken lines, is arranged for convenient attachment to the following-end of a proceeding roll. Fabric will be used alternately from rolls in the position of rolls 10 and 61 as will also be understood by those familiar with the art.

The bare fabric between roll 10 and tension roll 13 is either free or substantially free of tension and accordingly has approximately the same crimp in the warp as when woven. This will be seen by reference to Fig. 2 wherein the relative positions of tension-free warp cords 70, 71 and filling threads 72 are shown. Cords 70 and 71 are to become the strain members of a cord tire and they are retained in side-by-side relation by the filling threads. If they are cotton cords they may be, for example, .034" gauge and have a count of 26 ends to the inch. If they were rayon they would probably be .029" gauge and have a count of 29 ends to the inch. Size of cord, count, etc., may be changed, and nylon, rayon, wire or strain members of other materials found satisfactory may be substituted for the cotton cords discussed here in detail. The filling threads 72 perform no useful function after the fabric is rubberized. Before rubberizing, the filling threads serve only to make possible the handling of the strain or warp members in the form of fabric as compared to handling each cord in a separate spool. As will be seen in Figs. 2 and 3 the filling is substantially free of crimp prior to the application of longitudinal tension on the warp 70 and 71. In this condition the filling threads bear lightly against the warp.

It will be seen by reference to Figs. 4 and 5 that the tension applied to the bare fabric between tension roll 13 and the first calender has substantially removed the crimp from the warp and in doing so has crimped the filling threads. The removal of the crimp from the warp insures the complete burial of these cords in the sheet of rubber as will be seen as the specification continues. It will also be seen that the distance the filling or pick must traverse from one side of the fabric roll to the other has substantially increased due to becoming crimped. In this operation the filling threads often break in numerous places, however, it is to be understood that filling threads having stretching characteristics adapted for this stretching or necessary increase in length during calendering is contemplated by applicant.

Tension roll 13 is connected directly to the drag generator 14 through the medium of shaft 9 and it will be seen that idler roll 12 is so positioned as to effect considerable snubbing of fabric 5 about the roll 13 as the fabric is drawn into the bite of rolls 16 and 17. The arrangement is such as to permit tension control from 0 to extremely high tensions, as for example, 4,000 pounds by means of any suitable current regulator adapted to control the amount of drag. Said drag having a predetermined value set by the operator by means of a small rheostat 86 connected in the reference field of said current regulator as will be readily apparent to those familiar with the art. Once the calender operator sets the rheostat for a given tension it remains at that value, both at high and low speeds of the fabric travel and even during accelerating or decelerating periods. It will be understood that the energy required to turn roll 13 against the resistance of the generator results in returning a substantial portion of that energy into the power system whereby a substantial amount of such braking energy is retained for further use.

Following one common practice in operating a rubber calender, the first calender in this system including rolls 15, 16 and 17 are operated by feeding rubber, which has been broken down on a mill or otherwise caused to become warm and soft, into the bite of rolls 15 and 16, where the rubber forms a bank 18. The opening between rolls 15 and 16 is such as to permit a layer or coat of rubber 19 to pass therethrough and to travel on the surface of roll 16 toward and onto one side of fabric 5 as it passes between rolls 16 and 17. Rolls 16 and 17 are spaced apart a sufficient distance to permit the fabric 5 to pass therebetween and to cause the fabric to be squeezed between the rubber coat and the rolls whereby the rubber is forced upon and about the cords of the fabric 5.

During the first calender pass the ultimate position the cords will occupy in the completed rubber sheet is established and it will be seen at this point the position the cords will occupy relative to each other, the amount of crimp remaining in the cords, the amount the cords have been reduced in diameter due to tension, the spacing between the cords and the tension to which the cords have been subjected relative to each other is established. In the case of .034" gauge cotton cords, usually a .010" of rubber coating is laid upon and forced in and about the cords, this rubber being referred to in the industry as a skim coat. One practice is to press this coat upon the cords with rolls 16 and 17 traveling at even surface speeds. It will be noted that in the first calender pass that the rubber has been placed on one side of the fabric as will be seen by reference to Fig. 6. In practicing the present invention, the tension applied to the fabric is extremely high as compared to tensions used heretofore. This is made possible by the positive control provided through the medium of the drag generator, however, in the present invention there must be a relation between the tension on the fabric between rolls 13 and the first calender and the tension on the fabric as it leaves the first calender. In the present case the tensions on the fabric on both sides of the first calender roll 17 are equal and applicant has found a tension of 2500 pounds on each side to be satisfactory in calendering cotton cord fabric. It is to be understood, of course, that the tensions may be increased or decreased, or varied relative to each other if found desirable.

In either bank or straight skimming there must be a substantial pressure placed on the rubber between rolls 16 and 17 and rolls 35 and 36. This squeeze distorts the rubber and causes some of it to move away from the pressure or toward the oncoming fabric. Heretofore when the tension on the fabric from roll 10 was dependent on the resistance to its pull set up by the roll of fabric itself, said pull being created solely by the rotation of calender rolls 16 and 17 between which the fabric was squeezed, it often happened that either all the fabric or certain cords thereof, did not have sufficient tension to resist the backflow or movement of rubber, with the result that the fabric would wrinkle or buckle just before passing into the bite of the calender rolls. When this occurred the fabric would become crushed by the calender rolls and often so badly that the cords would be completely severed. Such crushing resulted in serious material loss and the calender operator was confronted with the problem of regulating the squeeze so as to get the maximum pressure of the rolls on the fabric and rubber without causing the wrinkling or buckling of the fabric just described.

The greater the squeeze the better rubber impregnation of the fabric, however, to obtain the best results the ideal fabric tension relative to a given squeeze of the rubber and fabric between the calender rolls should be given the fabric. This means in practice that, for example, as roll 17 is raised toward roll 16 increasing the squeeze of rubber and fabric passing between these rolls that the tension on the fabric 5 should be and in fact must be, increased until these two forces, squeeze and tension, are in proper balance, as observed by the calender operator. Since high tension on fabric 5 has not been used heretofore it was only possible to subject such skim to a relatively light squeeze. The light squeeze resulted in very limited penetration of rubber between the cords of the fabric and it is an important feature of the present invention to make possible improved penetration of rubber at this first calender pass. Since the amount of tension placed upon fabric 5 is controlled by means of a manually operated rheostat it will be seen that the said balance between squeeze and tension may be definitely and conveniently maintained.

Poor rubber impregnation results in inferior tires or other products in which such fabric may be used. Since the rolls of fabric delivered to the calender have overhanging or conical ends it is obvious that such end portions of the rolls will be too soft to set up the same resistance as the center of the roll to fabric being pulled from the roll by the calender. Then too, since the diameter of the roll of fabric progressively decreased as the fabric was unwound therefrom, the required pull of the fabric to turn the roll against the resistance of the mechanical brake progressively increased and made it impossible, for the calender operator, to maintain a desired relation between tension, speed, rubber, etc.

Another outstanding cause of the variation in the quality of the rubberizing operation heretofore was the variation in the mechanical braking, since these were never adequate, required almost constant maintenance, or replacement, and heated up so frequently and badly that it was not unusual for workmen to provide water handy to throw on hot brakes. Accordingly, tension ran from too low to too high. Since there was no equal or, in fact, no tension on the fabric on the outlet side of the calender, when the tension became high there would be slippage between the calender rolls and the fabric. That is, the grip of the calender rolls on the fabric and rubber was not sufficient to advance the fabric. Such slippage was not uniform across the calender rolls because the opening between the rolls is not uniform due to crown of the calender rolls. This variation in the opening between the rolls resulted in the serious fault of the cords receiving uneven tensions. The uneven tension resulted, in the case of tires built from such fabric, in some of the cords carrying the load while others were left with so much residual stretch therein that they did not do their share of work with the result of broken, overworked cords and premature tire failure. Applicant applies his tension to the cord fabric independent of the fabric roll and mechanical brakes. Further, he provides high tension on the fabric at the outlet side of the calender thereby drawing the fabric between the calender rolls substantially independent of the forward pull on the fabric by the calender rolls. This eliminates many of the causes of uneven tension on the cords.

Controlled tension on the feed and outlet side of the calender makes possible higher tensions than could be used heretofore. High tensions result in taut cords having reduced diameters and accordingly increased spacing therebetween at the point the fabric is passing between the calender rolls. This facilitates the forcing of the rubber between and about the cords.

By reference to Fig. 6 it will be seen that the rubber coat placed upon the fabric by the first calender pass substantially fills the space between the cords, it being noted that there is a tendency for the rubber to draw back somewhat after the fabric has passed from between rolls 16 and 17.

Next the fabric passes through a compensator including dancer roll 22, sprocket wheels 29a and 30a mounted on bar 23 in fixed relation therewith, air cylinders 25 and 26, and piston rods 27 and 28, with sprocket chains 29 and 30 attached to said piston rods 26 and 27 respectively, and extending over said sprocket wheels and being attached to the ends of rod 3 on which the dancer idler roll 22 is supported and rotates.

This compensator performs the usual function of such devices when used with train calenders, or calenders in tandem arrangements. However, the present compensator has the additional and main function of balancing the tension provided ahead of the first pass calender, and also, synchronizing the two main calender motors by means of a dancer rheostat. This compensator is designed so that its two cylinders use air from a factory line, not shown, and their tension valve can be set by adjusting an air valve, also not shown, at any desired valve between 0 and a very high tension, as for example, 4000 pounds. The compensator does differ structurally from the prior art in the support bar of the dancer roll being attached to the piston rods of air cylinders through the medium of sprocket chains. In the present arrangement the air cylinders 25 and 26 are charged with such predetermined air pressure as will exert a specified tension on the fabric approaching and leaving the dancer roll. In the present illustration, for example, a total of 2500 pounds of tension is used, which is the same tension as is placed on the fabric between tension roll 13 and the first calender.

From tension roll 32 the fabric passes between rolls 35 and 36 of the second rubber calender where the other side of the fabric is skim coated in the same, or similar manner as the coating on the first side was applied. In the second calendering it will be noted that a bank of rubber 37 occurs between the rolls 34 and 35 with a layer or skim coat of rubber 38 traveling on the surface of roll 35 into contact with the fabric as it passes between rolls 35 and 36. Then tension on the coat of one side of the fabric approaching the second calendering is regulated by the tension roll 32 directly connected by its shaft 8 with the drag generator 33, all in the same manner as described in connection with tension roll 13. The advantages of the tension in this second rubberizing operation are the same as in the case of the first calender pass except, however, it will be seen that the first calender pass, in which the cords were substantially incorporated in a rubber sheet, determines the spacing of the cords and also fills or almost fills the space between the cords leaving a much simpler rubberizing operation for the second calender pass. However, since the second calender pass completes the work of the first, it is important that it be performed under the most favorable tension conditions to insure the optimum of rubber impregnation of the fabric. While the compensator may take up differences between the speeds of the two calenders, it will be seen that the fabric must pass through these calenders at substantially the same speed. In order that the second calender may be operated as rapidly as the first calender, the same tension control device is used between the compensator and the second calender. The second calender operation is carried on under the same mechanical arrangement as the first whereby the cords are kept free from localized stresses and placed under sufficient tension to insure a satisfactory calendering operation.

If desired, the rolls 35 and 36 may be set so close together that there is not sufficient space for the coat of impregnating rubber to pass between the cords and roll 35 in which event a very small pencil-like bank of rubber will form on the fabric at the point it passes between the rolls 35 and 36. When the rolls are so set, the industry refers to the operation as bank skimming. It is contended by some skilled in the art that bank skimming insures complete impregnation of the fabric with rubber. It is to be understood that the speed of roll 35 and 36 may, if desired, be changed from even to odd speeds, in which event the ratio of speeds of the rolls is very close so that a slight frictioning effect is obtained.

The fabric leaving the second calender is in its final rubberized form illustrated in Fig. 7. It will be noted that the warp is completely encased in rubber and has equal coating on both sides thereof. From the second calender the fabric passes under idler roll 39, and under and back over the first roll 40 of the drier rolls. Drier roll 40 is driven by motor 46 through the medium of belt 47. Through the drive of roll 40 the predetermined tension desired on the outlet side of the second calender is placed on the fabric. In the present example, applicant places a total tension of 2500 pounds on the fabric between the second calender roll and the cooling roll 40. It is to be understood, however, that the relation between the tensions on the inlet and outlet side of the second calender may be varied as found satisfactory by the simple expedient of a rheostat control as explained relative to tension controls through the medium of drag generator 14.

From cooling roll 40 the fabric is led over the cooling drums 41, 42, 43, 44 and 45, thence over driven roll 48, which latter roll is driven by a motor 49 through the medium of shaft 7. From roll 48 the fabric passes to the take-off roll 50 driven by motor 51 through the medium of shaft 6. A separating liner 53 as it is unwound from roll 52 is simultaneously wound with the rubberized fabric into roll 50 in order to provide a separator or liner to prevent the surfaces of the unvulcanized rubber from sticking together. Since the present operation is a continuing operation, alternate means for handling take-off rolls are provided, as indicated by the broken lines in Fig. 1, the same consisting of the motor 55 and shaft 4 on which the shell 72 is mounted.

By reference to Fig. 1 it will be seen that the fabric 5 is urged forward at five separate stations. In sequence these stations are at the first calender, second calender, drier roll 40, driven roll 48, and driven take-off roll 50. The various elements of the apparatus employed in said continuous calendering operation have their movements controlled and synchronized by means known to electrical engineers and are commercially available. Since such controls are well-known and not claimed in the present application a detailed description of them would serve no useful purpose and is considered unnecessary. It will be noted, however, that there are four station tension controls set out herein above, namely, the drag generator 14 and the first calender; the compensator and its associated elements; the second drag generator 33 and the second calender; and the second calender and the driven drier roll 40. By way of example the control of the first station mentioned will be briefly described. Referring now to Fig. 8 a drag generator 14 and a booster generator 80 are connected in series to an auxiliary generator 81 which in turn is connected with a tach generator 83 which controls said auxiliary generator field 84. Each calender is driven by its own motor, not shown. Tach generator 83 is geared to the first calender motor and driven at the same speed the voltage generated being in direct proportion to the speed the generator 83 is driven. A booster field 85 of booster generator 80 is controlled by a hand rheostat 86. In similar fashion the various tension stations are controlled and the hand rheostats may be replaced with any satisfactory automatic control, a number of which are commercially available.

The present invention contemplates and provides means for subjecting each cord to the same longitudinal tension in their travel over the tension roll 13 to and into the bite of the first calender rolls 16 and 17. As stated above, roll 13 is a rubber-covered roll, but it is to be understood that the invention is not limited to such covering, or to any particular covering, or surface material since the coefficient of friction between the cords and the surface of this roll is one factor in establishing a predetermined total frictional contact with the cords passing thereover. The frictional relation between the cords and roll 13 is so controlled as to permit a maximum longitudinal pull of each separate cord, at which maximum pull the cord will slip on the surface of the roll. This is an important feature of the invention whereby in rubberizing each separate cord may be given approximately the same tension whether the cords are one in a roll of cord fabric or one of a series of cords coming from creels. How this may be done will now be explained.

The total friction between the cords that pass about roll 13 is affected by the diameter of the roll, velocity, the kind of material on the surface of the roll, particularly in respect to hardness or softness, the position of idler roll 12 relative to roll 13 and the nature of the cords themselves, as for example, cotton, rayon, nylon, etc. Also the friction between the cords and the roll will be influenced by the tension to which the cords are subjected on one or both sides of roll 13. Other factors may affect the frictional contact between roll 13 and the cords, and the above are mentioned to illustrate some of the means available to establish a selected predetermined maximum pull on a cord necessary to cause it to slip on said tension roll.

Assume, for example, that a tire engineer has determined that each cord should be rubberized at its first calender pass with exactly three pounds tension being exerted longitudinally on the cord. The present invention makes such results possible as will now be explained in detail.

First, various factors discussed above which establish the total amount of hold-back friction roll 13 will exert, on a single cord, are so employed as to fix said hold-back at three pounds. In the present illustration tension roll 13 is covered with a high quality abrasive resisting rubber of the character of tire tread compound. The outside diameter of the roll 13 is 10" and the idler roll 12 is so disposed that fabric 5 contacts approximately fifty percent of the circumference of the outer surface of roll 13. Obviously, the amount of such contact can be quickly and conveniently changed by adjusting the position of roll 12 relative to roll 13 and the invention contemplates any satisfactory mechanical means for such adjustment. If, for example, twelve hundred cords are to pass through the calender in closely spaced side-by-side relation, then the lag generator 14 will be set to require thirty-six hundred pounds torsionally exerted on its shaft 9 to drive the generator. Since each cord can pull but three pounds before it slips it will require all twelve hundred cords pulling their maximum of three pounds to exert the force necessary to drive the said generator. It will be seen that in a calendering operation of such cords, under the arrangement just described, that each cord will quickly take its three pounds of tension and that any originally tight cords, of the twelve hundred, will slip at three pounds tension, until the loose cords tighten to the same tension whereby the total thirty-six hundred pounds, necessary to drive the generator, is provided under which condition of cords the calendering operation proceeds with the cords constantly and automatically adjusting themselves to the predetermined three pounds per cord tension.

It is to be understood that the invention contemplates the handling of fabric that has been previously treated as in the case of certain dipping treatments of rayon cords before rubberizing or so-called gum dipped cotton cords. It is also to be understood that the invention contemplates the handling of fabric that has been previously treated as in the case of certain dipping treatments of rayon cords before rubberizing or so-called gum dipped cotton cords. It is also to be understood that the invention may be used in a similar manner as set out hereinabove to equalize and impart the amount of tension desired in cords before they are delivered to a rubber calender. The same is true in a textile mill to impart predetermined tensions to cords before they are wound into rolls.

Manufacturers of cord tires often receive cord fabric that is extremely baggy. Such fabric has tight cords at their edges and loose cords in their center portion. It has often happened heretofore that such fabric is so baggy that it cannot be calendered satisfactorily, if at all. It will be seen that the present invention provides means for overcoming these faults and makes possible uniformly stressed cords in a tire. If creel fabric is being rubberized, applicant's structure is equally effective in equalizing the tensions in the cords and operates in the same manner as described above. In the case of creel fabric, any one or more of individual cords may be tight, and the cords or cords may occur at any place in the width of the series of cords as they travel into the bite of the calender rolls. If the tight cords from the cones in the creel pull the load on tension device 13 then the loose cords will back up and wrinkle at the bite of the calender and create an unsatisfactory condition. Since in the present arrangement no cord can pull more than a predetermined amount, and since all the cords being rubberized must pull the same amount, it will be seen that the invention works equally well with the so-called weftless or creel cords as it does with the woven cord tire fabric.

The invention is adapted for operation with a four roll calender, or calenders of any type or arrangement, and it is to be understood that it is not to be limited to the specific details of construction described above and shown in the accompanying drawing, or to the particular sequence of method steps, since many modifications will readily occur to one skilled in the art from a consideration of this disclosure. The invention includes all modifications coming within the scope of the appended claims and their equivalents.

What is claimed is:

1. An apparatus for joining cords and rubber comprising in combination a calender to sheet cut the rubber, cord feeding means and means for applying predetermined uniform tension to said cords, said latter means comprising a tension roll over which said cord passes in frictional contact therewith, a drag generator, said roll being directly connected to said generator, and means for regulating the amount of energy required to drive said generator.

2. A tension device for calendering fabric comprising a friction roll over which the fabric passes, a drag generator, said roll being directly connected with said generator through the medium of a shaft upon which said roll is mounted in non-rotationable relation therewith.

WILLIAM J. SECREST.

REFERENCES CITED

The following references are of record in the file of this patent:

UNITED STATES PATENTS

| Number | Name | Date |
|---|---|---|
| 1,444,459 | Hall | Feb. 6, 1923 |
| 1,500,232 | Castricum | July 8, 1924 |
| 1,500,234 | Castricum | July 8, 1924 |
| 1,605,453 | Midgley | Nov. 2, 1926 |
| 1,624,532 | Castricum | Apr. 12, 1927 |
| 1,714,848 | Castricum | May 28, 1929 |
| 2,415,023 | Novotny | Jan. 28, 1947 |